Jan. 6, 1959 L. J. KMIECIK 2,867,123
SEALING MEANS
Filed March 8, 1956
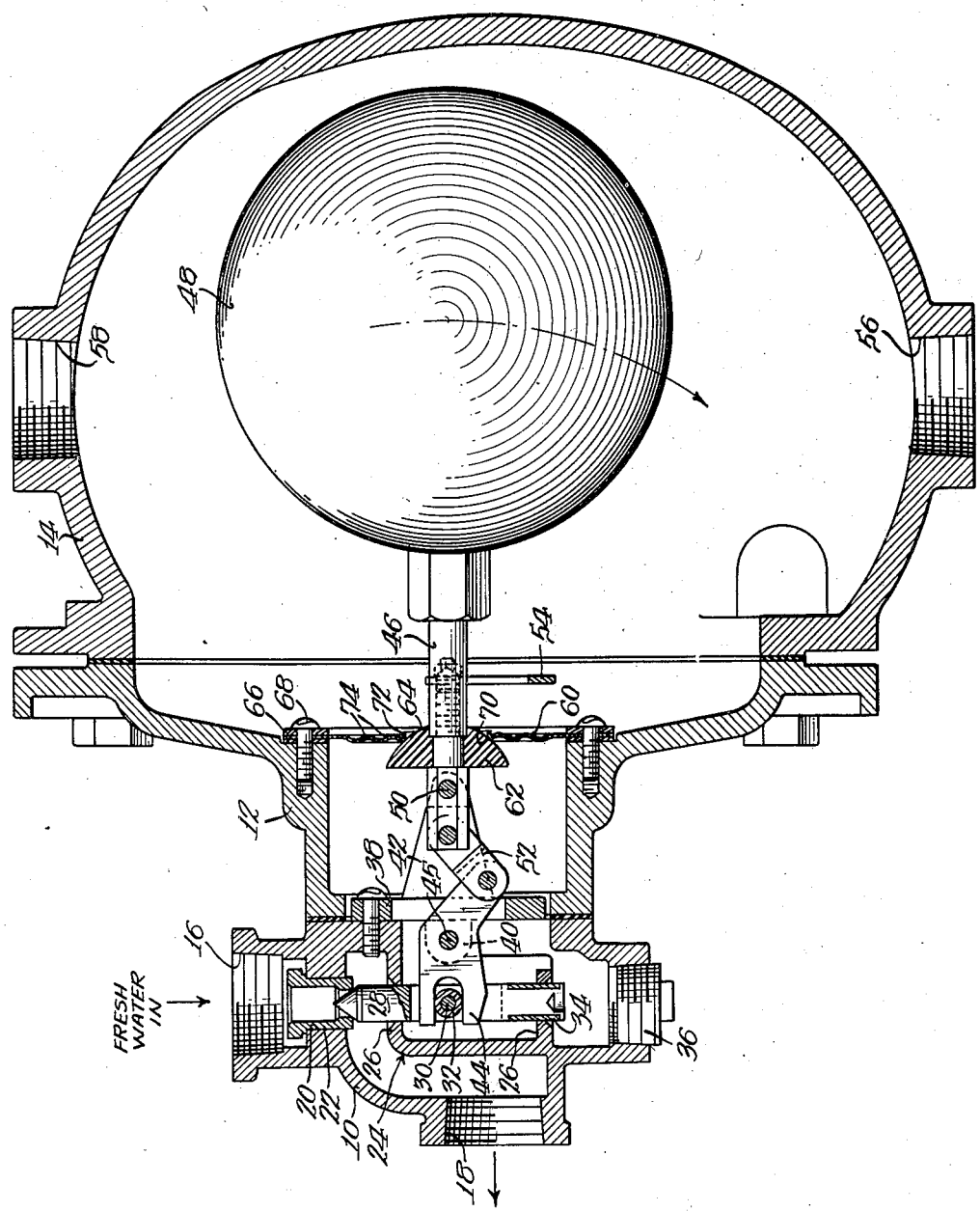
INVENTOR.
Leopold J. Kmiecik
BY
Brown, Jackson, Boettcher & Dienner
Attys.

2,867,123
Patented Jan. 6, 1959

2,867,123

SEALING MEANS

Leopold J. Kmiecik, Chicago, Ill., assignor to McDonnell & Miller, Inc., Chicago, Ill., a corporation of Delaware Application March 8, 1956, Serial No. 570,269

2 Claims. (Cl. 74—18.1)

The present invention relates to sealing and like isolating means for pivotally movable or gyratory instrumentalities, and to improved float actuated devices embodying such means.

One object of the invention is to provide improved sealing or isolating means for pivotally movable and gyratory instrumentalities effectively isolating the mounting means for and/or other apparatus associated with the instrumentality from the environment or apparatus within which the instrumentality operates, and affording complete freedom of movement of the instrumentality in its arcuate or circular path of movement with respect to its mounting.

It is also an object of the invention to provide improved float actuated devices including the said improved sealing means for the arcuately movable stem or shaft of the float to seal the means to be actuated by the float from the float bowl and the liquid therein.

Another object of the invention is to provide improved sealing or isolating means including a pair of members mounted for relative arcuate movement, one of the members having a spherical surface movably engaging a complementary circular surface on the other member to effect the seal.

A further object of the invention is the provision of improved means as above defined wherein one of said members exerts a resilient force against the other to insure sealing engagement thereof, and wherein at least one of said members is formed of a material having an exceedingly low coefficient of friction to accommodate free relative movement of the two members despite their forcible engagement.

An additional object of the invention is to provide improved means of the character above defined wherein the material of at least one member is a fluorinated polymer, preferably polymerized tetrafluoroethylene.

A still further object of the invention is the provision of improved isolating means comprising a pair of members mounted for relative arcuate movement, one of the members having a spherical surface the radial center of which is coincident with the axis of relative movement of the members, the other of the members comprising a thin resilient plate having a central hole of a diameter intermediate the base and crown diameters of the spherical surface of the one member, the hole being struck from the radial center and on the radius of the spherical surface to define a circular seat on said plate complementary to said spherical surface, the axis of said seat being perpendicular to and intersecting the axis of relative movement of the members, the one member being formed of polymerized tetrafluoroethylene and sealingly engaging at its spherical surface on said circular seat irrespective of the relative position of said members.

According to the invention, said means affords the advantages that the spherical member, being formed of polytetrafluoroethylene, provides substantially frictionless engagement of the members, prevents accumulation of foreign matter on the seal and imparts exceedingly long life to the seal, while the plate member eliminates necessity for formation of a complex seating surface and, due to its resiliency, maintains sealed engagement of the members. Both members are economically formed, and result in an effective seal of low cost and improved longevity of service.

Other objects and advantages of the invention will become apparent in the following detailed description of a preferred embodiment of the invention.

Now, in order to acquaint those skilled in the art with the manner of making and using the improved isolating means and float actuated device of my invention, I shall describe, in connection with the accompanying drawing, a preferred construction of said means as embodied in a float controlled valve assembly.

Referring to the drawing, I have shown in vertical cross section a float actuated valve assembly comprising a valve housing 10 bolted or otherwise secured to the cap 12 of a float bowl 14. The valve housing 10 includes a fluid inlet 16 at one end thereof, a fluid outlet 18 at the side thereof opposite the cap 12, and a valve port 20 between the inlet and outlet, an insert 22 being fitted in the port to define a valve seat. The housing 10 also includes internal wall means 24 defining a generally L-shaped path of fluid flow between the inlet and outlet, the wall means including spaced parallel walls 26 extending transversely of the inlet. The two walls 26 are bored coaxially of the inlet 16 and valve port 20 to define guide means for a vertically reciprocable cylindrical valve member 28 which is intimately but slidably received within the said bores. At its upper end, the valve member 28 includes a conical head normally entering within and engaging the valve seat insert 22 to close the valve.

Intermediate the walls 26, the valve member 28 is slotted and a pin 30 is extended diametrically through the slotted portion of the member, the pin 30 rotatably mounting a roller bearing 32 within the slot. For convenience in manufacture, the slot is cut into the valve member from the lower end thereof, and a sleeve 34 is fitted on the lower end of the valve member to guide the same within the bore in the lower one of the walls 26. To facilitate assembly of the valve, the lower end of the housing 10 is provided with a tapped bore through which the valve member may be entered, whereafter the bore is closed by a pipe plug 36.

At the side thereof attached to the cap 12, the housing 10 mounts a bracket member 38 having a ring portion attached to the housing within the interior of the cap 12. The member 38 includes a pair of spaced parallel brackets 40 extending into the housing 10 and a similar pair of brackets 42 extending into the cap 12. The brackets 40 project into the space defined by the wall means 24 of the housing 10 and provide therein a support for a valve actuating lever 44 which is pivotally mounted intermediate its ends on the brackets by means of horizontal pivot pin 45. At one end, the lever 44 extends into the slot in the valve member 28 and is bifurcated to fit slidably over the bearing 32 operatively to connect the valve and the lever.

The brackets 42 adjacent their outer ends define within the cap 12 a support for the stem or shaft 46 of a float ball 48 which is disposed within the float bowl 14 in the usual manner. The stem or shaft 46 of the float ball is pivotally mounted in spaced relation to the free end thereof on the brackets 42 by means of a horizontal pivot pin 50, the ball and its shaft thus being mounted for arcuate movement in a substantially vertical plane. The free ends of the float ball stem 46 and the lever 44 are operatively connected by means of a link 52 pivotally connected at its ends to the respective members.

The float ball 48 is responsive to variations in liquid level in the float bowl and is operative to close and open the valve in accordance with such variations. Assuming a normal liquid level in the bowl 14, the float is positioned as shown wherein it retains the valve closed to prevent addition of liquid to the system. Should the liquid level decrease, the float 48 moves downwardly in an arcuate path about the pivot axis 50, whereupon the inner or free end of the stem 46 is moved arcuately upward to raise the link 52 and the outer end of the lever 44, thus lowering the inner end of the lever 44 and forcing the bearing 32, pin 30 and valve member 28 downwardly to move the valve off its seat. As will be appreciated, valve actuation is a function of the fluid force of the liquid in the inlet 16 and the weight of the float ball as magnified by the mechanical advantage of the actuating mechanism. As shown, descent of the float 48 is limited by a stop 54 mounted on the cap 12 and including a portion underlying the shaft 46 to be engaged by the same when the shaft has moved downwardly through a predetermined arc of movement from its normal position, the stop serving to prevent engagement of the float ball with the surfaces of the bowl after the valve 28 has been moved to full open position. The float bowl 14 is provided with a fluid inlet 56 and an overflow fluid outlet 58, the inlet being suitably connected in the system with which the valve is associated and the outlet 58 leading to a suitable drain or the like from a level above the normal liquid level of the system. As liquid is added to the system through the valve, the liquid level within the float bowl rises thus moving the float ball 48 upwardly until the ball reaches its normal position, whereupon the valve 28 is closed in the obvious manner.

Float actuated valve means of the character described are adapted for a wide variety of uses, including the control of boiler water feed in heating systems. In such systems, the inlet 16 is connected to a source of fresh water supply, the outlet 20 is connected to the boiler or feed water heater of the boiler, and the float bowl 14 is connected at any suitable location in the system where the float may sense the desired water level or maintain a predetermined pressure head. Due to its location, the float bowl is frequently filled with dirty water from the system. If the rust, foreign particles and sediment in the water were permitted to accumulate on the pivot pins, lever and link of the valve actuating mechanism, and on the surfaces of the valve and the bearings therefor, it is apparent that the valve would quickly be rendered inoperative. For these reasons, the actuating mechanism of the assembly and the means actuated thereby must be sealed.

The particular object of the present invention is to provide improved sealing means for isolating the actuating mechanism and the means actuated thereby from the float and the float bowl, or stated more broadly, the environment within which the arcuately movable member 46 operates. In conjunction with such improved sealing or isolating means, it is to be observed that the wall means 24 and cap 12 of the assembly shown comprise housing means for the actuating mechanism and the device or devices actuated thereby. To close the end of the said housing means that normally open into the float bowl, thus to seal the mechanism therefrom, the improved seal of the present invention comprises a first or seating member 60 in the form of a partition and a second or sealing member 62 cooperable therewith, the two members being mounted for relative arcuate movement as will appear more fully hereinafter.

The sealing member 62 is mounted on the shaft 46 of the float ball in spaced relation to the pivot axis 50 of the shaft and adjacent the outer end of the cap or housing means 12. To facilitate mounting of the member 62, the shaft is preferably formed of separable parts including the shaft proper and a shouldered extension threaded into the shaft, the extension being mounted on the pivot pin 50.

The sealing member 62 has an axial stepped bore therethrough and is mounted on said extension and fixedly confined between a radial shoulder on the extension and the end of the shaft proper. The member 62 includes a spherical external surface 64 facing toward the member 60 and having as its radial center a point coincident with and located centrally of the pivot axis of the float. Preferably, the member 62 comprises a segment of a sphere, the radial center of which sphere coincides with the axis of arcuate movement of the member. If the apparatus disclosed were intended for marine use, it would be advisable to mount the float ball for universal movement so that the ball would always sense the horizontal level of the water in the system irrespective of the disposition of the float bowl with respect to horizontal. In such structure, the shaft 46 of the float ball would be mounted in gimbals to accommodate universal arcuate movement or gyration of the shaft 46, the gimbals defining a pair of pivot axes disposed at right angles to and intersecting one another. In such structure, the spherical segment 62 would have as its radial center the point of intersection of the two axes of the gimbals.

The seating member 60, in the preferred embodiment of my isolating means, comprises a thin plate or partition, suitably of annular form, of a size to close the open end of the cap 12. Preferably, the member 60 comprises a thin sheet metal stamping formed of Phosphor bronze to prevent rusting. Adjacent its outer margin, the member 60 is anchored to the cap 12 in such manner that the plane thereof, or at least the plane of the central portion thereof, intersects the spherical surface of the sealing member 62. The partition member may suitably be secured in sealed relation to the cap by a mounting ring 66 and screws 68. At the central portion thereof, the member 60 is provided with a circular hole 70 through which the shaft 46 and a portion of the sealing member extend, the hole being of a diameter to accommodate the desired arcuate movement of the float ball shaft. The hole 70 is struck from the pivot axis 50, i. e., the radial center of the spherical segment 62, on the radius of the spherical surface of the member 62, so that the inner margin of the annular plate defines a circular seat complemental to at least a continuous line on the spherical surface of the segment 62. As noted, the member 60 is preferably a sheet metal stamping, and in stamping the same, I prefer to bend the portions thereof at the margin of the center hole 70 outwardly in the direction of the float ball 48 to define an axially extending annular rim or flange 72. The bending out of the annular rim results in a rounded corner or inner margin of the member at the edge of the hole 70 to define a smooth circular seat for the spherical segment. As thus formed, the circular hole 70 and annular rim 72 are disposed with the common axis thereof perpendicular to and intersecting the pivot axis of the float ball, the circular seat defined thereby being spaced from the pivot axis and being struck therefrom on the radius of the spherical surface of the member 62.

In addition to the foregoing, the partition member 60 includes a plurality of annular corrugations 74 concentrically circling the annular rim 72 to impart resiliency in the axial direction to said member, said member being so mounted that the circular seat defined by the hole 70 seats under slight spring force on the spherical surface of the segment 62. This is a highly advantageous feature in apparatus of the character described, since resilient sealing force is effectively exerted from the float ball side of the partition without necessitating disposition of a spring in the float bowl, thereby minimizing the elements of the combination and mitigating against sources of difficulty in use of the apparatus.

The spherical segment 62 has a base diameter greater than the diameter of the hole 70, or the inner diameter of the annular rim 72, and a portion of the spherical surface of the segment extends into the interior of the annular rim. In the preferred embodiment of the invention, the segment 62 and the seat defined by the member 60 are concentric and aligned axially of one another in the normal position of the two parts. Also, it is preferred that the seat defined by the member 60 engage the segment substantially centrally of the spherical surface 64 and parallel to the base of the segment, and that the length of the arc between the seat and the base on the spherical surface 64 of the segment be slightly greater than the arcuate distance a point on the spherical surface would travel upon occurrence of the full stroke of arcuate movement of the shaft 46, i. e., from the normal horizontal position shown in the drawing to the position defined by the stop 54. Due to the defined relationship, the spherical surface 64 of the segment 62 in all positions thereof engages the circular seat defined by the member 60 along a continuous line to seal the opening or hole 70 in the member 60, thus to seal the valve actuating mechanism within the cap 12 from the float bowl proper, the resilient force of the member 60 on the segment insuring an effective seal therebetween.

In addition to the foregoing, the structure shown and described would also accommodate the described arc of movement of the shaft 46 upwardly from its normal position and laterally to opposite sides of its normal position while maintaining the defined seal, if such movement were accommodated by the means to which the shaft is connected. Thus, the seal is entirely effective despite the possibility of the shaft moving upwardly above its horizontal position or laterally to either side of its normal position as a consequence of looseness in the pivotal mounting of the shaft. Moreover, the spherical segment 62 and the circular seat defined by the plate 60 thus are capable in the preferred embodiment of accommodating universal arcuate movement of the shaft 46 while maintaining the sealed engagement of the two parts.

In view of the immediately foregoing, it is to be appreciated that the sealing means of the invention in its preferred embodiment is adapted for use with a wide variety of arcuately movable instrumentalities, such for example as the pivotally mounted shaft 46 shown herein, or a similar shaft mounted at one end on a universal joint to accommodate movement of the shaft in two planes or in a gyratory path.

While the structure disclosed is preferably employed in most devices to which the invention is applicable, modification thereof for particular installations is readily effected. This is especially true in instances wherein the instrumentality with which the seal is to be associated has a definite, limited path of movement. For example, in the valve assembly shown herein, the base of the spherical segment 62 could be inclined to the axis of the shaft 46 from the upper edge of the base downwardly and forwardly to a point spaced slightly to the rear (left) of the point at which the lower edge of the seat engages the sphere. Even with such slope, sealing engagement between the member 62 and its circular seat would be maintained in all positions of the shaft 46, since movement of the shaft takes place only downwardly from the position shown.

To enhance the sealing action, reduce wear, mitigate against accumulation of foreign matter and minimize frictional resistance between the two members of my improved isolating means, the material from which the members, or at least one of them, is constructed is of substantial importance. In particular, I form at least one of the members, preferably the spherical segment 62, from a fluorinated polymer. Polymerized tetrafluoroethylene, commercially available under the tradename "Teflon," is a material remarkably resistant to chemical action and to heat, being readily usable throughout the range of minus 150° to plus 575° F., and withstanding attack by all materials except molten alkali metals. Heat resistance is, of course, essential in boiler feed water control systems as herein described. Moreover, this plastic is exceedingly tough and has a very low coefficient of friction, so low in fact that the material has a slippery wax- or soap-like feel to human touch. Polytetrafluoroethylene is an excellent electrical insulator, so that the means of the invention when embodying such material is also capable of use in electrical installations. This plastic material, which is available in rods, tubes, blocks and sheets, can be machined easily with standard wood and metal-working tools, and can also be molded in substantially any desired shape. For these reasons, I prefer to form the spherical segment 62 of my seal from polytetrafluoroethylene, the spherical surface of the sealing member being conveniently, accurately and smoothly provided, especially by molding the segment. In addition, the plate member 60 may then be formed simply and economically as a metal stamping requiring no machining.

With the two members formed of the materials above described, the segment maintains an exceedingly low coefficient of friction between the two members of the seal, and affords a self lubricating characteristic, so that there will be substantially no wear of the members in use. The spherical surface of the segment due to the mitigation of wear and the inherent toughness of polytetrafluoroethylene, will be maintained accurate and smooth to enhance and insure the sealing action throughout the full life of the equipment with which the sealing means is associated. Moreover, due to the low coefficient of friction, sediment, foreign matter and the like will not adhere to or accumulate on the spherical segment, and any particles that tend to stick thereto will be brushed off as the segment moves with respect to its seat, whereby the sealing means will retain full effectiveness throughout the life of the apparatus with which associated. Thus, it will be apparent that all of the objects and advantages of the invention have been demonstrated herein as being obtainable in a convenient, practical and highly economical manner.

While I have described and shown what I regard to be a preferred embodiment of the isolating means and float actuated device of my invention, it is to be appreciated that various changes, rearrangements and modifications may be made therein without departing from the scope of the invention, as defined by the appended claims.

I claim:

1. Sealing means comprising a thin annular metallic stamping having an axially extending annular rim bent outwardly to one side of the stamping at the inner circular margin thereof, said stamping having annular corrugations therein concentrically surrounding said annular rim, said corrugations imparting resiliency in an axial direction to said stamping and rendering the same responsive to differentials in the fluid pressure exerted on different sides thereof, and a spherical segment of polymerized tetrafluoroethylene, said segment having a base portion and a spherical surface portion in which the diameter of the base portion is greater than the inner diameter of said annular rim, and means for pivotally mounting said spherical segment at the center of curvature of the spherical surface thereof and to the side of said stamping opposite said annular rim with the spherical surface of said spherical segment movably engaging within the base portion of said annular rim, said spherical segment sealingly engaging said stamping at the base of said annular rim, and said stamping due to its resiliency maintaining a spring seat on said spherical segment to maintain the seal therebetween.

2. Sealing means comprising a thin annular metallic stamping having an axially extending annular rim bent outwardly to one side of the stamping at the inner circular margin thereof, said stamping having annular corrugations therein concentrically surrounding said annular rim, said corrugations imparting resiliency in an axial direction to said stamping and rendering the same responsive to differentials in the fluid pressure exerted on opposite sides thereof, and a spherical segment having a base portion and a spherical surface portion in which the diameter of the base portion is greater than the inner diameter of said annular rim, and means for pivotally mounting said spherical segment at the center of curvature of the spherical surface thereof and to the side of said stamping opposite said annular rim with the spherical surface of said spherical segment movably engaging within the base portion of said annular rim, said spherical segment sealingly engaging said stamping at the base of said annular rim, and said stamping due to its resiliency maintaining a spring seat on said spherical segment to maintain the seal therebetween.

References Cited in the file of this patent

UNITED STATES PATENTS

| | | |
|---|---|---|
| 541,164 | Holland | June 18, 1895 |
| 1,051,025 | Spicer | Jan. 21, 1913 |
| 1,495,010 | Ford | May 20, 1924 |
| 1,997,785 | Carlson | Apr. 16, 1935 |
| 2,313,128 | Densten | Mar. 9, 1943 |
| 2,717,792 | Pelley | Sept. 13, 1955 |